June 27, 1967

L. R. DOWNING, JR 3,327,444
STRUCTURAL BEAM IN A GRID SUPPORTING
FABRIC COVERED PANELS

Filed Oct. 21, 1964

INVENTOR.
LUCIEN R. DOWNING JR.
BY

ATTORNEYS.

June 27, 1967  L. R. DOWNING, JR  3,327,444
STRUCTURAL BEAM IN A GRID SUPPORTING
FABRIC COVERED PANELS Filed Oct. 21, 1964 4 Sheets-Sheet 3

INVENTOR.
LUCIEN R. DOWNING JR.
BY
*Schramm, Kramer & Hayes*
ATTORNEYS.

United States Patent Office 3,327,444
Patented June 27, 1967

3,327,444
STRUCTURAL BEAM IN A GRID SUPPORTING FABRIC COVERED PANELS
Lucien R. Downing, Jr., Avon Lake, Ohio, assignor to Donn Products, Inc.
Filed Oct. 21, 1964, Ser. No. 405,379
9 Claims. (Cl. 52—476)

As indicated, this invention relates to a structural beam which is particularly useful in suspended ceiling systems, and more particularly to a lightweight beam for supporting in suspended relation to a wall, floor or ceiling structure large module panels, e.g. fabric or plastic sheet covered fiber glass batts.

New products, e.g. luminous, acoustical, insulating and fire proofing materials used in suspension systems present new and different problems for suspending them.

The lightweight structural beam herein described, provides an improved structure which is especially adapted for suspending ceiling forming material, panels, or units, combinations thereof.

The beam is characterized by a pair of web portions in parallel spaced relation. Along one marginal edge of the beam, the webs are inwardly rolled. The confronting rolled marginal edges form a nip, that is, they are designed to compressively engage and frictionally retain flexible fabric or sheet plastic material nipped therein. Each web has a flange portion laterally extending therefrom intermediate its marginal edges.

Fiber glass panels of heavy batt thickness, that is approximately two inches, are designed to be supported on the flanges of the beam. The fiber glass panel is covered with a fabric or plastic sheet which extends beyond the marginal edges of the fiber glass. The ends of the fabric are tucked between the confronting rolled marginal edges of the beam. In this manner the supporting beams are hidden from view and the joint is very pleasing to the eye.

The beam as designed, is easily adapted for use as a cross-beam for intersecting another beam of similar design. For example, a plurality of intersecting beams may be formed into a panel supporting grid for panels having a predetermined geometric configuration compatible with that of the grid. A composite panel formed by a fireproof panel in spaced relation to the fiber glass panel may be supported on a composite beam formed by interlockingly suspending a structural T-section from the structural beam as hereinatfer described.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Briefly stated this invention is in a lightweight structural beam used in suspension systems for supporting panels thereon. In accordance herewith, a beam is provided having a pair of webs in closely spaced parallel relation, i.e. from about .03″ to about .30″ apart. The webs are joined together along one marginal edge. Generally, these beams are formed of a single sheet of metal by rolling into a generally U-shaped cross-section. The other marginal edges of the webs are rolled inwardly towards each other to form a nip for compressively engaging fabric edges to retain them tightly therebetween. The confronting rolled marginal edges are designed to spread apart and to resiliently spring closed to compressively engage material placed therebetween. Each web has a flange laterally extending therefrom intermediate its marginal edges and usually although not necessarily at right angles to the web. The oppositely disposed flanges are designed to support panels placed thereon.

The beam thus described may be used in combination with a T-beam coextensive therewith and supported therefrom, forming a composite beam. The composite beam provides a pair of panel supporting flanges in spaced relation.

A plurality of beams described above, may be used in suspension systems for supporting panels therein to form a ceiling, for example. The beams are particularly adapted for forming a grid wherein the beams are in parallel spaced relation forming a rectangular geometric configuration. A plurality of intersecting beams may be used in combination wtih the parallel beams forming openings of another geometric configuration. Panels may be supported in such openings.

Figure 1:
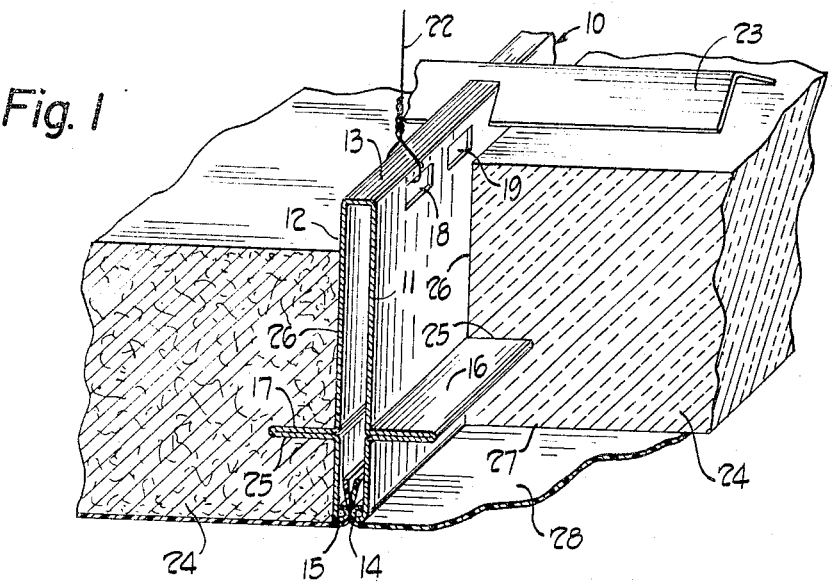
FIG. 1 is a perspective view of a portion of a beam embodying this invention shown supporting a pair of fiber glass panels.

Referring more particularly to FIG. 1 of the annexed drawings there is shown a lightweight structural beam, generally indicated at 10, used in suspension systems for supporting panels thereon. Beam 10 is composed of a pair of web portions 11 and 12 in parallel closely spaced relation. The webs 11 and 12 are preferably coextensive and are parallel to each other. The webs 11 and 12 are joined along one marginal edge 13. The other free marginal edges 14 and 15 of webs 11 and 12, respectively, are rolled inwardly towards each other. The confronting rolled marginal edges 14 and 15 and designed to compressively engage material placed therebetween.

Extending from the webs 11 and 12, respectively, are oppositely disposed flanges 16 and 17 respectively. The flanges 16 and 17 are intermediate the marginal edges of the webs 11 and 12, respectively, and are designed to support panels placed thereon. The beam 10, as seen in FIG. 1, is preferably fabricated from a single sheet of sheet metal. In order to do this the flanges 16 and 17 are rolled. Holes, e.g., holes 18 and 19, are punched in the webs 11 and 12 along their upper joined marginal edge 13. The holes are used to engage means to suspend or support the beams, such as beam 10, from heavier and more permanent framework forming the floor, wall, or ceiling. Means for suspending the beams, e.g., guy wire 22 looped through the hole 18 and around the beam 10, are secured to the heavier beams to support the lighter weight beams such as beam 10, therefrom. In cases where a plurality of beams such as beam 10, are used to form a grid wherein the beams are in parallel spaced relation, a combination stabilizer and spacer, e.g., stabilizer 23, is used to keep the beams in parallel alignment as well as stabilizing the beam against rotation or tilting.

Although lighter weight panels may be supported on the flanges 16 and 17, the beam 10 is specifically designed to support a panel having a thickness of approximately two inches. As seen in FIG. 1, a panel 24 having approximately a two-inch thickness has a recess or kerf 25 in its marginal edge 26 for supporting coaction with the flanges 16 and 17 of the beam 10. In cases where the grid is composed on a plurality of intersecting beams forming squares or rectangles the panels would then have recesses, similar to recess 25, in all marginal edges.

The panel 24 is composed of a sound proofing or insulating material, e.g., resin bonded fiber glass. The exposed face 27 of the panel 24 is preferably covered with a fabric or plastic sheet 28 preferably having a decorative exposed surface and whose ends extend beyond the marginal edges of the panel 24. As seen in FIG. 1 the edges of the fabric sheet, e.g., edge 29, are tucked or nipped between the confronting rolled marginal edges 14 and 15 of webs 11 and 12, respectively. The fabric 28 is compressively engaged and supported therebetween. The beams are covered by the fabric, and the joint between adjacent similar panels, such as panel 24, is very pleasing to the eye.

Figure 2:
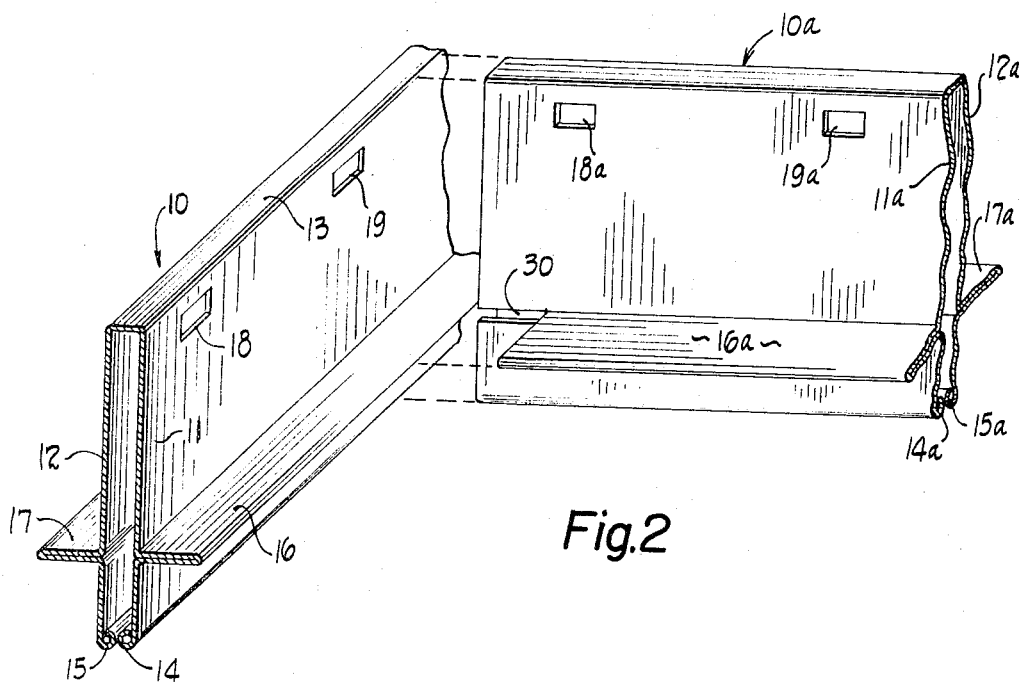
FIG. 2 is a perspective view of a portion of two beams disposed for intersecting relation and showing the end of one beam adapted for intersection with the angularly disposed beam.

FIG. 2 graphically illustrates the relative ease with which the beams 10 are joined to form a grid having a rectangular geometric configuration. For example, if beam 10a were to be joined to similar beam 10, portions of flanges 16a and 17a of beam 10a, adjacent the beam 10 would be cut away leaving a recess 30 in each of the web portions 11a and 12a for interlocking coaction wtih the flange 16 of the beam 10. The rolled edges 14 and 15, where they intersect with similar edges 14a and 15a, must be cut to form a continuous recess into which the ends of the fabric sheet are tucked.

Figure 3:
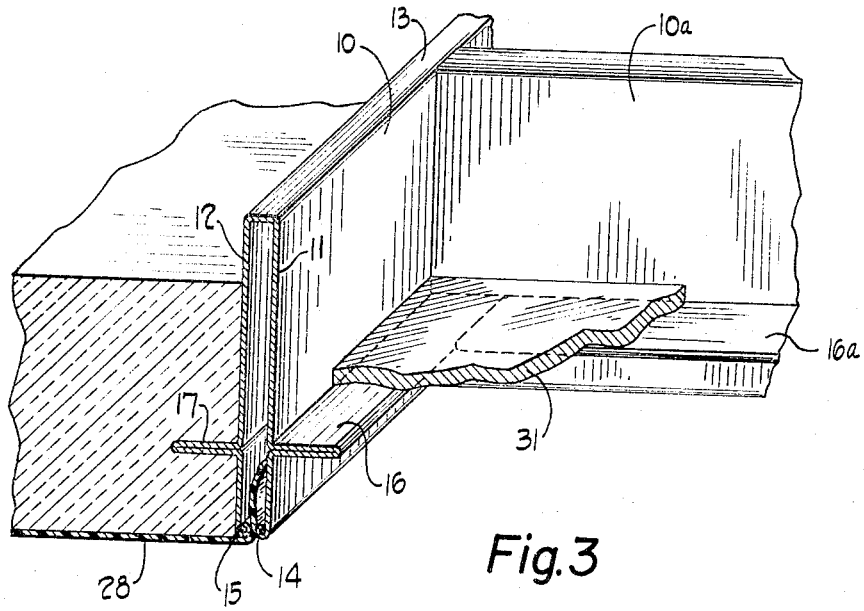
FIG. 3 is a perspective view of two intersecting beams, showing in particular how a diffuser panel used with an electric fixture is supported on the flanges of the beams.

FIG. 3 graphically illustrates how openings are prepared for electric fixtures. Diffuser panels, e.g., panel 31, or fixtures (not shown) are supported on the flanges of the beams, e.g., flanges 16 and 16a of beams 10 and 10a, respectively.

Figure 4:
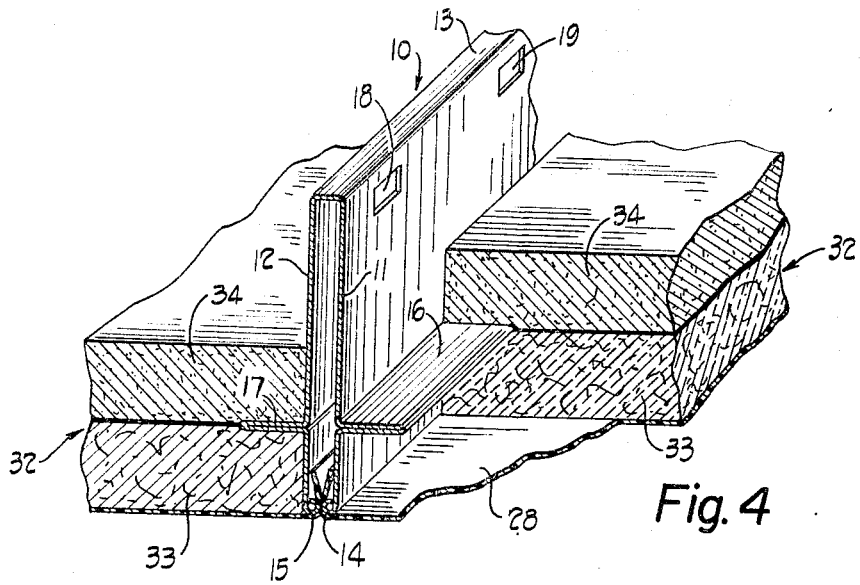
FIG. 4 is a perspective view of the embodiment of the invention of FIG. 1 in combination with a composite panel, e.g. a gypsum board portion in laminar relation to a fiber glass portion.

FIG. 4 graphically illustrates the use of a composite panel 32 with the structural beam 10. In place of the 2 inch fiber glass panel a similar fiber glass panel 33 having a thickness of approximately 1 inch is combined with a fireproof panel 34, e.g., gypsum, having a thickness ranging from about ¼ inch to 1 inch. The panels 33 and 34 may be joined together by any suitable means, e.g., an adhesive.

Figure 5:
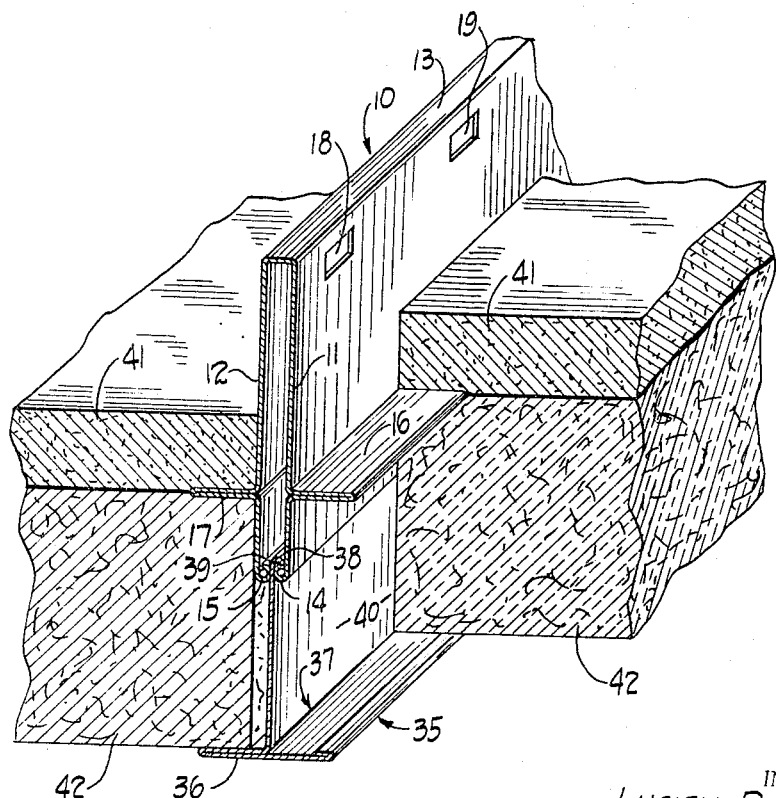
FIG. 5 is a perspective view of another embodiment of this invention particularly adapted for use with a composite panel.

In the embodiment of the invention seen in FIG. 5, a structural T-beam 35 is secured to and hung from the main beam or section 10 to form a composite beam. The T-beam or section 35 has a bilaterally extending flange 36 along its lower marginal edge 27 and a rolled edge 38 along its upper marginal edge 39. The rolled edge 38 is inserted and supported between the rolled edges 14 and 15 of webs 11 and 12, respectively, of beam 10. In this embodiment of the invention, the flange 36 is exposed.

The web 40 of the beam 35 may vary in depth to accommodate fiber glass, acoustic or insulating panels varying in thickness from ⅝ inch to approximately 2 inches. Also, in this embodiment of the invention a fireproofing panel 41, e.g., gypsum, is supported on the flange 16 in juxtaposed relation to fiber glass panel 42, or it may be disposed in spaced relation thereto provide an additional insulating air space.

Figure 6:
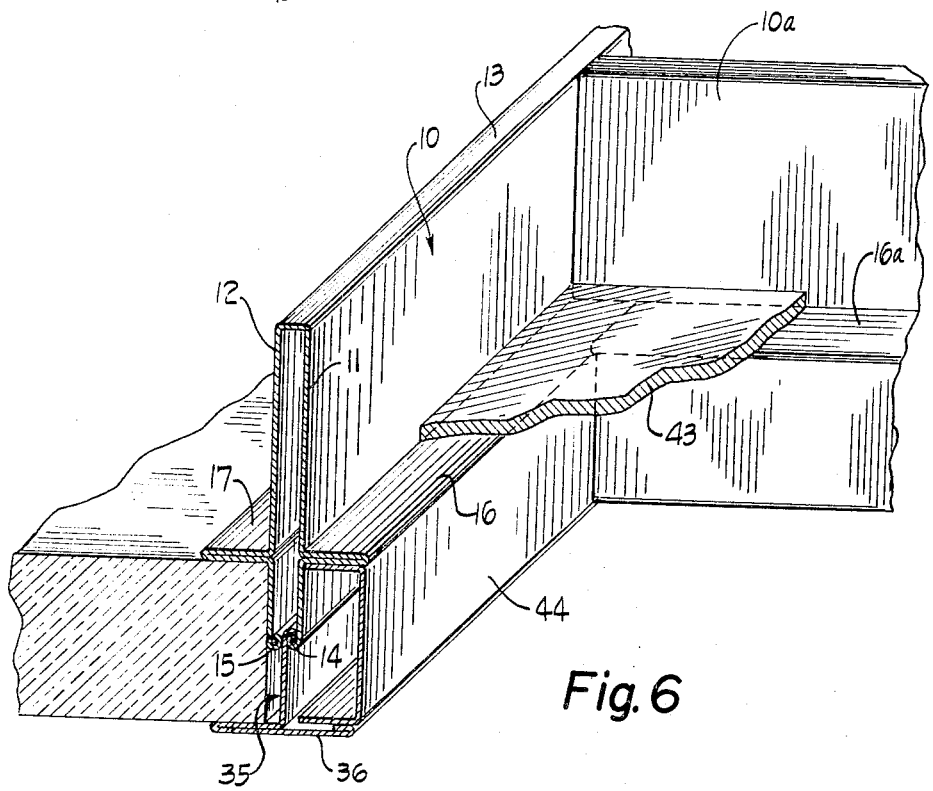
FIG. 6 is a perspective view of portions of two intersecting beams similar to the embodiment of the invention shown in FIG. 5, and particularly points out use of a diffuser panel used with an electric lighting fixture.

FIG. 6 is a graphic illustration of the treatment of an electric fixture when the embodiment of the invention shown in FIG. 5 is used. Again, a diffuser panel 43 or electric fixture (not shown) is supported on the flanges of the beam, e.g. flanges 16 and 16a of beams 10 and 10a, respectively. To give the opening covered by the diffuser panel 43 an aesthetic appearance, a shroud or channel member 44 is secured between the flanges 16 and 36 of the beams 10 and 35, respectively.

Figure 7:
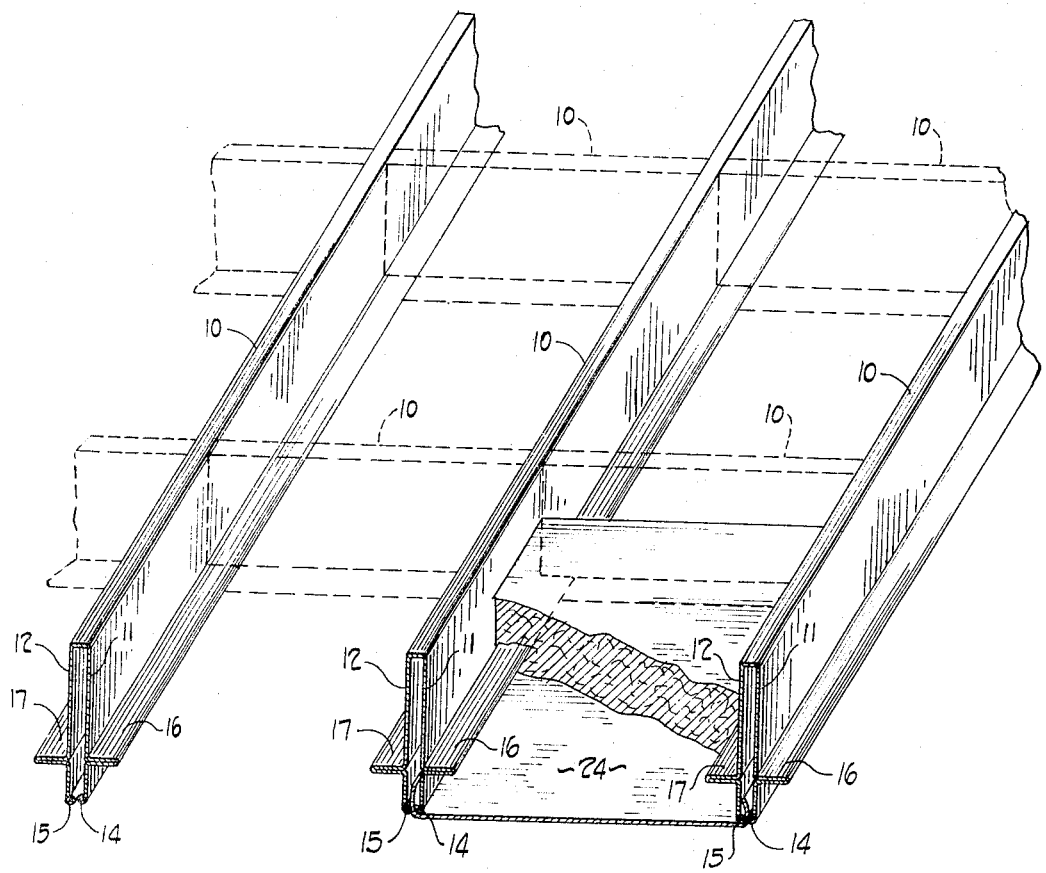
FIG. 7 is a perspective view of two grid systems using the embodiment of the invention shown in FIG. 1.

As previously indicated, a plurality of beams 10 may be used to form a grid. FIG. 7 is a graphic illustration of two types of grid systems. The first system uses a plurality of beams 10 in parallel spaced relation. The heavy 2″ fiber glass fabric covered panels make possible such a grid system, as this particular panel can be manufactured to specific room sizes. The cross beams (in dotted line) are eliminated, making fabrication of the grid system a relatively simple operation. The elimination of such cross beams, plus the use of longer panels provides a system which is easily and quickly installed.

However, in some cases, it may be necessary to use cross beams, e.g. the use of lighting fixtures or light diffusing panels. Also, to provide certain aesthetic appearances, e.g. 2′ x 2′ or 3′ x 3′ block or basket weave patterns using a panel covered with a coarse, grained fabric material, the use of similar cross beams 10 (in dotted line) may be necessary.

Thus, there has been provided a lightweight structural beam, which when used in combination with similar beams, in a suspension system using fiber glass panels with fabric covering, gives the finished ceiling a very pleasing appearance. The beam is also suited for use with a T-section wherein a composite beam is formed to support a composite panel of acoustic, or insulating material bonded to fireproofing material.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A structural beam in a grid supporting fabric covered panels in spaced relation to a floor, ceiling or wall comprising:
   (a) a pair of parallel closely spaced web portions each having first and second marginal edges spaced from and parallel to each other;
   (b) means for connecting said webs together adjacent said first parallel marginal edges;
   (c) panel supporting flange means laterally extending from each of said webs intermediate the marginal edges of said webs for receipt internally by a panel; and
   (d) fabric nipping means resiliently confrontingly disposed along said second marginal edges of said webs compressively engaging free ends of fabric covering the panels.

2. A structural beam in a grid supporting fabric covered panels in spaced relation to a floor, ceiling or wall surface comprising:
   (a) an elongated beam having a generally U-shaped cross-section;
   (b) a panel supporting flange laterally outwardly extending from each of the sides of said beam intermediate the marginal edges of said section for receipt internally by a panel;
   (c) inwardly directed fabric nipping means disposed in resilient confronting relation along the opposed free marginal edges of said beam engaging and holding free ends of fabric covering the panels.

3. A structural beam in accordance with claim 2 in which the fabric nipping means includes a pair of inwardly rolled beads coextensive with said free marginal edges of said beam.

4. A grid supporting fabric covered panels in spaced relation to a ceiling including a plurality of beams arranged in panel supporting array, each of said beams comprising:
   (a) a pair of parallel closely spaced web portions each having first and second marginal edges spaced from and parallel to each other;
   (b) means for connecting said webs together adjacent said first parallel marginal edges;
   (c) panel supporting flange means laterally extending from each of said webs intermediate the marginal edges of said webs for receipt internally by a panel; and
   (d) fabric nipping means resiliently confrontingly disposed along said second marginal edges of said webs compressively engaging free ends of fabric covering the panels.

5. A suspended ceiling system comprising:
   (a) a plurality of parallel spaced beams, each of the beams having:
      (i) a pair of webs in parallel spaced relation, each web having spaced parallel marginal edges, the upper marginal edge of one web being joined with the adjacent upper marginal edge of the other web, the other marginal edges of the webs being rolled inwardly towards each other, and designed to compressively engage material placed therebetween;
      (ii) a flange laterally outwardly extending from each web intermediate its marginal edges, the flanges being oppositely disposed for supporting panels placed thereon;
   (b) panels supported between the beams on the flanges of the beams, each of the panels formed from insulating and sound proofing material having its exposed surface covered with fabric, the fabric extending beyond the panel edges for insertion between the confronting rolled marginal edges of the beams.

6. A suspended ceiling system comprising:
   (a) a plurality of spaced beams, each of the beams having:
      (i) a pair of webs in parallel spaced relation, each web having spaced parallel marginal edges, the upper marginal edge of one web being joined with the adjacent upper marginal edge of the other web, the other marginal edges of the webs being rolled inwardly towards each other and designed to compressively engage material placed therebetween;
      (ii) a rolled flange extending from each web and integral therewith, the flanges being oppositely disposed intermediate the webs' marginal edges for supporting panels placed thereon;
   (b) a T-beam supported from each of the spaced beams and coextensive therewith, forming composite beams, each T-beam having:
      (i) a web having spaced parallel marginal edges, one of the marginal edges being rolled for supporting engagement with and between the inwardly rolled marginal edges of the supporting beam;
      (ii) a bilaterally extending flange along the other marginal edge;
   (c) composite panels disposed between the composite beams on the flanges thereof, each of the composite panels comprising:
      (i) a first panel of insulating and sound proofing material supported on the flanges of the T-beams;
      (ii) a second panel of fireproofing material supported on the flanges of the supporting beam in vertically spaced relation to the first panel.

7. A suspended ceiling system comprising:
   (a) a plurality of parallel spaced main beams having transversely secured therebetween parallel spaced cross beams, the intersecting similar main and cross beams forming a predetermined geometric configuration, each of the beams having:
      (i) a pair of coextensive webs in parallel spaced relation each web having spaced parallel marginal edges, the upper adjacent marginal edges of the webs being joined together, the other marginal edges of the webs being rolled inwardly toward each other, and designed to compressively engage material placed therebetween;
      (ii) a rolled flange extending from each web and intergral therewith, the flanges being oppositely disposed intermediate the webs, marginal edges for supporting panels placed thereon;
      (iii) the cross beams at their intersecting edges having a portion of their flanges cut away leaving a recess in the webs for supporting coaction with the flanges of the supporting beam; and
   (b) panels supported between the spaced beams on the flanges of the beams, each of the panels formed from insulating and sound proofing material having its exposed surface covered with fabric, the fabric extending beyond the material edges for insertion between the rolled marginal edges of the beams.

8. A suspension system comprising:
   (a) a plurality of parallel spaced composite main beams having transversely secured therebetween, parallel spaced similar composite cross beams, each of the composite beams having a main beam section comprising:
      (i) a pair of webs in parallel spaced relation each web having spaced parallel marginal edges, the webs being joined together along one pair of adjacent marginal edges, the other marginal edges of the webs being rolled inwardly towards each other, and designed to compressively engage material placed therebetween; and
      (ii) a rolled flange extending from each web and integral therewith, the flanges being oppositely disposed intermediate the webs, marginal edges for supporting panels placed thereon; and
      (iii) a T-beam section supported from each of the main beam sections and coextensive therewith, each T-beam section having:
         (1) a web with spaced parallel marginal edges, one marginal edge being rolled for supporting engagement with the inwardly rolled marginal edges of the main beam section;
         (2) a bilaterally extending flange along the other marginal edge;
   (b) composite panels supported between the composite beams of the flanges thereof, each of the composite panels comprising:
      (i) a first panel of insulating sound proofing material supported on the flanges of the T-beam sections;
      (ii) a second panel of fire proofing material supported on the flanges of the main beam section in vertically spaced relation to the first panel.

9. A composite beam comprising in combination:
   (a) a main beam including:
      (1) a pair of parallel closely spaced web portions each having first and second marginal edges spaced from and parallel to each other;
      (2) means for connecting said webs together adjacent said first parallel marginal edges;
      (3) panel supporting flange means laterally extending outwardly from each of said webs intermediate said marginal edges;

(4) nipping means resiliently confrontingly disposed along said second marginal edges of said webs;
(b) a sub-beam having a T-shaped cross section removably mounted on the main beam, comprising:
   (1) a web portion extending from the nipping means of said main beam and lying in a plane parallel to the plane of the webs of said main beam, said web portion having spaced parallel marginal edges, one of said edges being inserted between said nipping means;
   (2) a panel supporting flange disposed along the other of said parallel marginal edges in spaced relation from the flanges of the main beam; and
   (3) retaining means disposed along the inserted marginal edge of said sub-beam, for interlocking engagement with said nipping means to hold the beams together in juxtaposed relation.

References Cited
UNITED STATES PATENTS

| | | | |
|---|---|---|---|
| 2,389,897 | 11/1945 | Davis | 24—259 |
| 2,602,978 | 7/1952 | Clark | 24—259 |
| 2,734,126 | 2/1956 | Kruger | 52—706 X |
| 3,058,172 | 10/1962 | Phillips | 52—475 |

FRANK L. ABBOTT, *Primary Examiner.*

JOHN E. MURTAGH, *Examiner.*